Dec. 12, 1961     H. E. STOVER     3,012,388
MEANS FOR SEALING THREADED-TYPE CONTAINERS
Filed Oct. 23, 1958     10 Sheets-Sheet 1

INVENTOR.
HARRY E. STOVER
BY
ATTORNEY

Dec. 12, 1961 H. E. STOVER 3,012,388
MEANS FOR SEALING THREADED-TYPE CONTAINERS
Filed Oct. 23, 1958 10 Sheets-Sheet 3

INVENTOR.
HARRY E. STOVER
BY
ATTORNEY

Dec. 12, 1961 H. E. STOVER 3,012,388
MEANS FOR SEALING THREADED-TYPE CONTAINERS
Filed Oct. 23, 1958 10 Sheets-Sheet 4

INVENTOR.
HARRY E. STOVER
BY
ATTORNEY

Dec. 12, 1961  H. E. STOVER  3,012,388
MEANS FOR SEALING THREADED-TYPE CONTAINERS
Filed Oct. 23, 1958  10 Sheets-Sheet 7

INVENTOR.
HARRY E. STOVER
BY
Norman H. Holland
ATTORNEY

United States Patent Office 3,012,388
Patented Dec. 12, 1961

3,012,388
MEANS FOR SEALING THREADED-TYPE CONTAINERS
Harry E. Stover, Lancaster, Ohio, assignor to Anchor Hocking Glass Corporation, Lancaster, Ohio, a corporation of Delaware
Filed Oct. 23, 1958, Ser. No. 769,220
6 Claims. (Cl. 53—315)

The present invention relates to the sealing art and more particularly to a machine for applying closure caps to containers.

Sealing machines are now in use which apply closure caps and which form vacuum seals on containers at high speed and these machines, such as the machine disclosed in the United States Patent No. 2,618,425 owned by the assignee of the present invention, move the containers at high speed in a straight line and in spaced relationship beneath a cap-applying and sealing mechanism. At present the quickest and most effective seals have been made by these machines with the press-on type of closure caps where the caps are forced downwardly over the container rim and wherein the caps are held in position on the containers without the use of screw threads or other screw-threaded type fasteners. While such press-on closure caps are more readily applied in the first instance and while they provide a satisfactory seal in some applications, many packages preferably use a threaded-type of fastener which uses cooperating threads or lugs and threads. These threaded-type closure caps, for example, are preferably used on products where the consumer has occasion to re-apply the cap from time to time during the consumption of the product. An example of such a product is jams or jellies where the container might be opened a dozen or more times as it is used by the consumer. For such an application it is desirable to have a cap which is both a threaded-type cap and which provides a relatively tight or vacuum seal at the time of the initial packing.

The present invention provides a sealing machine which applies such threaded-type closure caps while forming a vacuum seal on the container and which also has the advantages of the high-speed straight line sealing machine.

The machine of the present invention is suitable for use with closure cap fastening means wherein a relative rotation is required between the cap and the container to fasten the cap in place. Such a connection may comprise cooperating threads on both the cap and the container or it may comprise a lug means on either the cap or the container and a cooperating continuous or interrupted thread on the other member. For purposes of this description and the appended claims, such cap fastenings where relative rotation is required between the cap and the container will be referred to as threaded-type caps or containers or packages as the case may be.

Accordingly, an object of the present invention is to provide an improved means for sealing containers.

Another object of the present invention is to provide an improved sealing machine for threaded-type containers.

Another object of the present invention is to provide a relatively simple sealing machine for threaded-type packages which is capable of high-speed operation.

Another object of the present invention is to provide an improved vapor-type sealing machine for use with threaded-type packages.

Another object of the present invention is to provide an improved sealing machine for threaded-type packages which is readily adjustable to handle containers and caps of varying size.

Another object of the present invention is to provide an improved cap applicator for a sealing machine.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 28 is a diagrammatic view of another embodiment of the sealing machine using a pair of belts at the cap applicator station; and FIG. 29 is a diagrammatic view of the successive container rotating belt and shoe means of the sealing machine illustrated in FIG. 1.

*General description*

The sealing machine will first be described generally with particular reference to the perspective view of the machine in FIG. 1.

The machine 1 has a base 2 mounting an elongated horizontal conveyor belt 3 in the usual manner for sealing machines such as is shown in the above-mentioned United States patent. The belt 3 is driven in the usual manner so that it moves containers 4 beneath the sealing means indicated generally at 5. A suitable spacing means such as is shown in the Patent No. 2,618,425 may be used to space the containers 4 on the belt 3. As each of the containers 4 is moved beneath the sealing means 5, the container 4 picks up a cap 6 from a cap feed 7. The cap feed 7 may be any suitable cap feed of the type which presents caps in an inclined position to the moving container rims so that the container rims draw the caps 6 out of the cap feed 7 and onto its mouth. A suitable cap feed is disclosed in the United States Patent No. 2,618,425. A preferred embodiment of a cap applicator for use at the outlet end of the cap feed 7 will be described more fully below.

As the container 4 is moved beneath the sealing means 5 and before the container 4 contacts the cap 6 at the cap applicator, a container rotating means engages each container 4 and turns it about its vertical axis in a direction which tends to disengage the cap 6 from the container fastening means. This container rotating means comprises an endless moving belt 8 and a stationary friction shoe 9. The belt 8 is driven at a faster rate than the conveyor 3 so that the container 4 is given a combined rotational and forward movement as it is simultaneously moved by the conveyor 3 and is rolled along the edge of the friction shoe 9 by the belt 8. This reverse rotation of the container 4 spins it in a reverse sense with respect to the engaging threads on the cap 6 and it tends to position all the lugs or threads on the cap 6 on the same side of the container threads. This eliminates an unintentional cocking of the closure cap where one lug or thread may be positioned beneath a container thread and the remaining lugs or threads may be positioned on top of the closure threads. When a closure is applied to the container threads in this cocked position, it becomes locked and cannot thereafter be turned to its sealed position.

The rotating container is next moved beneath the cap applicator 10 at the bottom of the cap feed 7, at which point the upper rim of the container engages a cap 6 and the cap 6 is loosely applied to the container top by the cap applicator 10. Thereafter, the container 4 with the cap 6 loosely applied thereon is moved beneath the top pressure belt 11 which is operatively connected to the drive for conveyor 3 so that its lower surface is moved at the same rate as the conveyor 3 as described in Patent No. 2,618,425. Belt 11 forces the cap 6 downwardly while the cap 6 is simultaneously engaged in its sealed position by the cooperating sealing belt 12 and the stationary friction shoe 13 which engage the container side walls. The sealing belt 12 is moving at a faster rate than the conveyor 3 so that the container 4 is rolled along the edge of the friction shoe 13 in such a direction as to cause the threaded-type connectors of the container 4 and the cap 6 to be tightly engaged.

In order to provide a vacuum seal, the container 4 is moved beneath steam tunnel 14 as it approaches the cap applicator 10 which distributes a layer of steam about and within the headspace of container 4 to displace the air therefrom and also preferably to sterilize the headspace. When the cap 6 is applied to the container 4 at the applicator 10, the container headspace is filled with steam. After the sealing of the container, this trapped steam condenses creating a vacuum in the container headspace. In order to prevent the re-entry of air into the container headspace after the application of the closure and during the sealing action of the belts 11 and 12 and the friction shoe 13, an elongated steam outlet 15 is provided adjacent to the path of the top of the container 4 to form an atmosphere of steam surrounding the container top and the cap 6.

The diagrammatic drawing (FIG. 29) shows the positioning of the successive pairs of belts and friction shoes to provide the above-described two-stage rotation of the container during the sealing action.

Another embodiment of the invention is shown schematically in FIG. 28. In this embodiment the friction shoe 9 is replaced with a second side belt 8' similar to the side belt 8. This embodiment is used where the particular type of closure cap used provides no locking problems on its initial application and where no initial reverse rotation is thus required to seat the cap for its final sealing rotation. The two cooperating side belts 8 and 8' draw the container 4 past the applicator without a rotary action and the belts 8 and 8' assist in the withdrawal of the closure 6 from the cap feed 7.

*Container rotating assembly*

Figures 1, 2A, 2B:
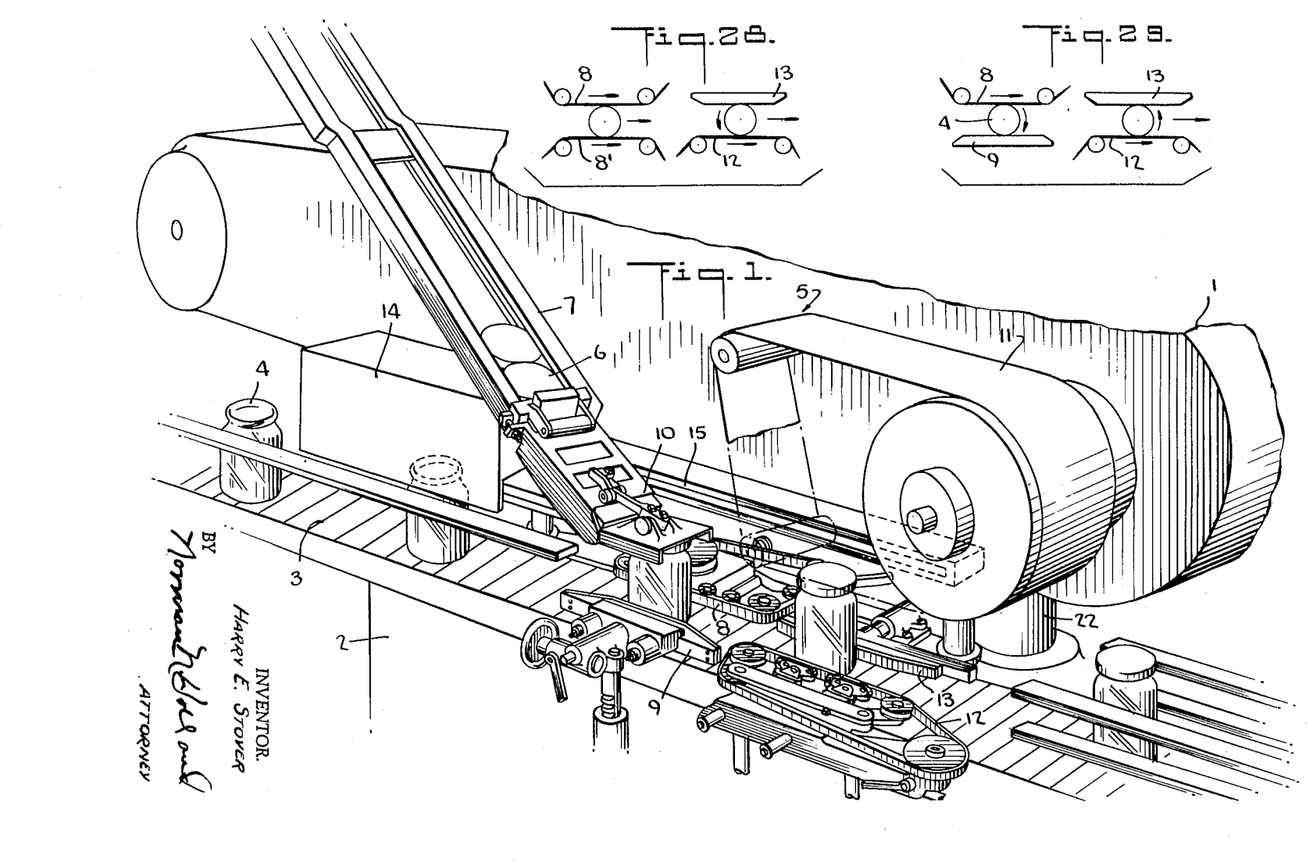
FIG. 1 is a perspective view partially cut away of the sealing machine according to the invention.
Figures 2, 3, 4, 5:
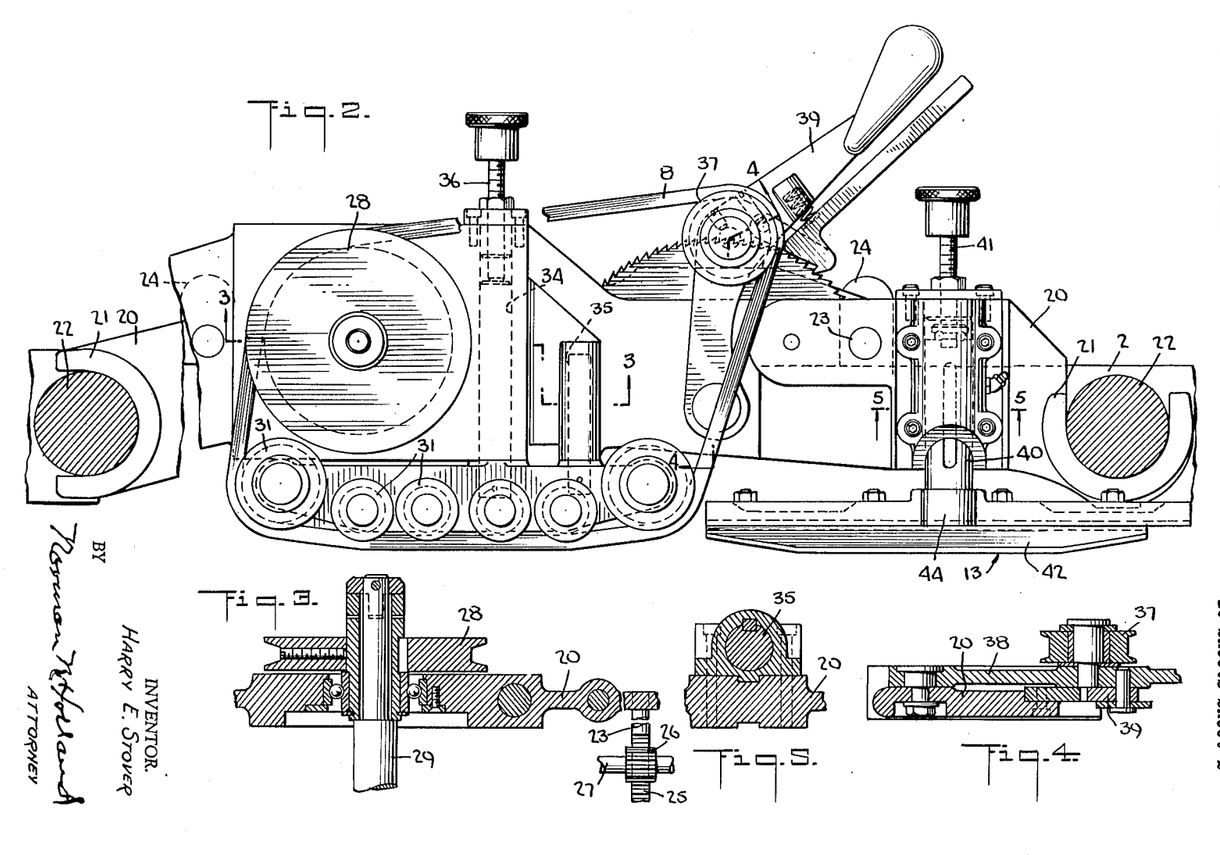
FIG. 2 is an enlarged detailed top plan view of a container rotating belt and shoe assembly.
FIGS. 3, 4, and 5 are sectional views taken along the lines 3—3, 4—4, and 5—5 of FIG. 2.
Figure 6:
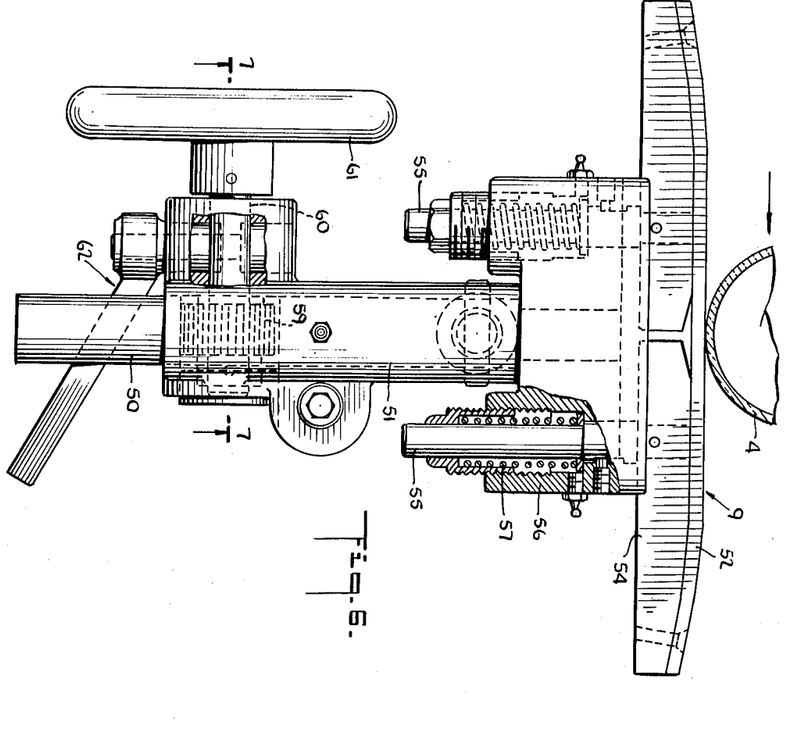
FIG. 6 is an enlarged detailed plan view of a friction shoe means.
Figure 7:
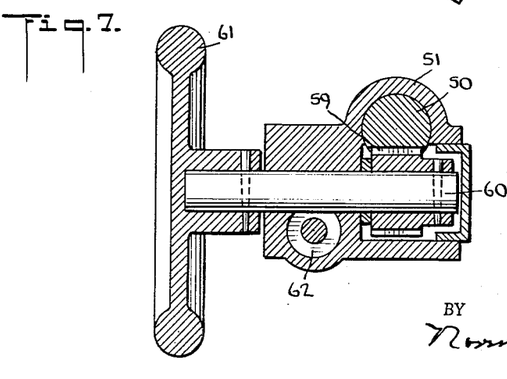
FIG. 7 is a sectional view taken along lines 7—7 of FIG. 6.
Figure 8:
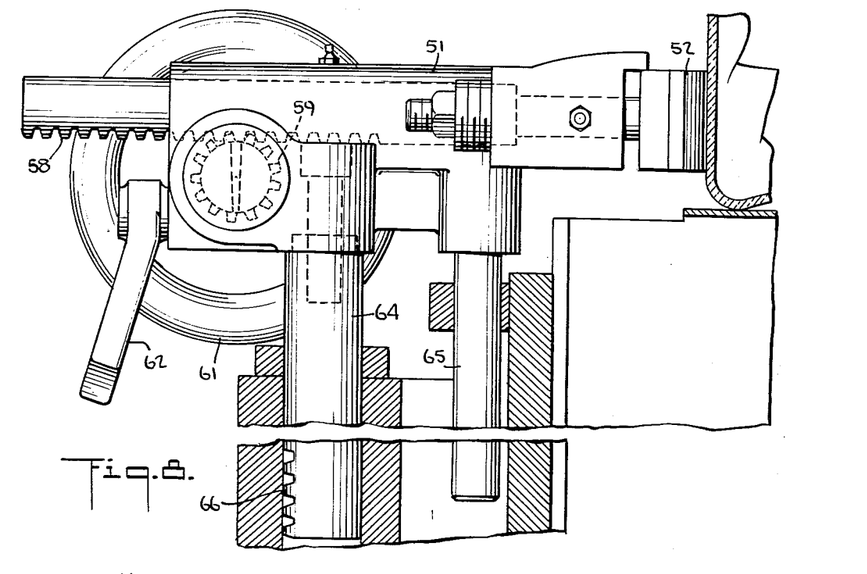
FIG. 8 is a side elevational view of the friction shoe means of FIG. 7.
Figure 9:
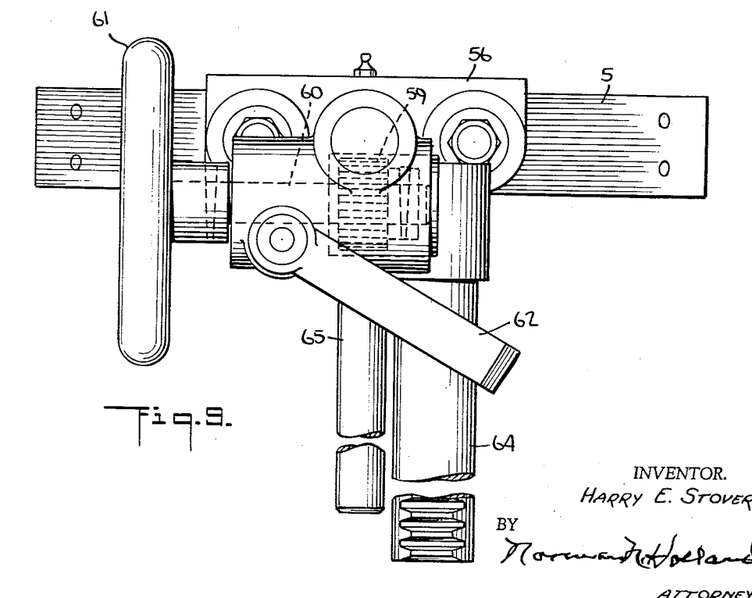
FIG. 9 is a side elevational view of the friction shoe means of FIG. 7.
Figures 10, 12, 13:
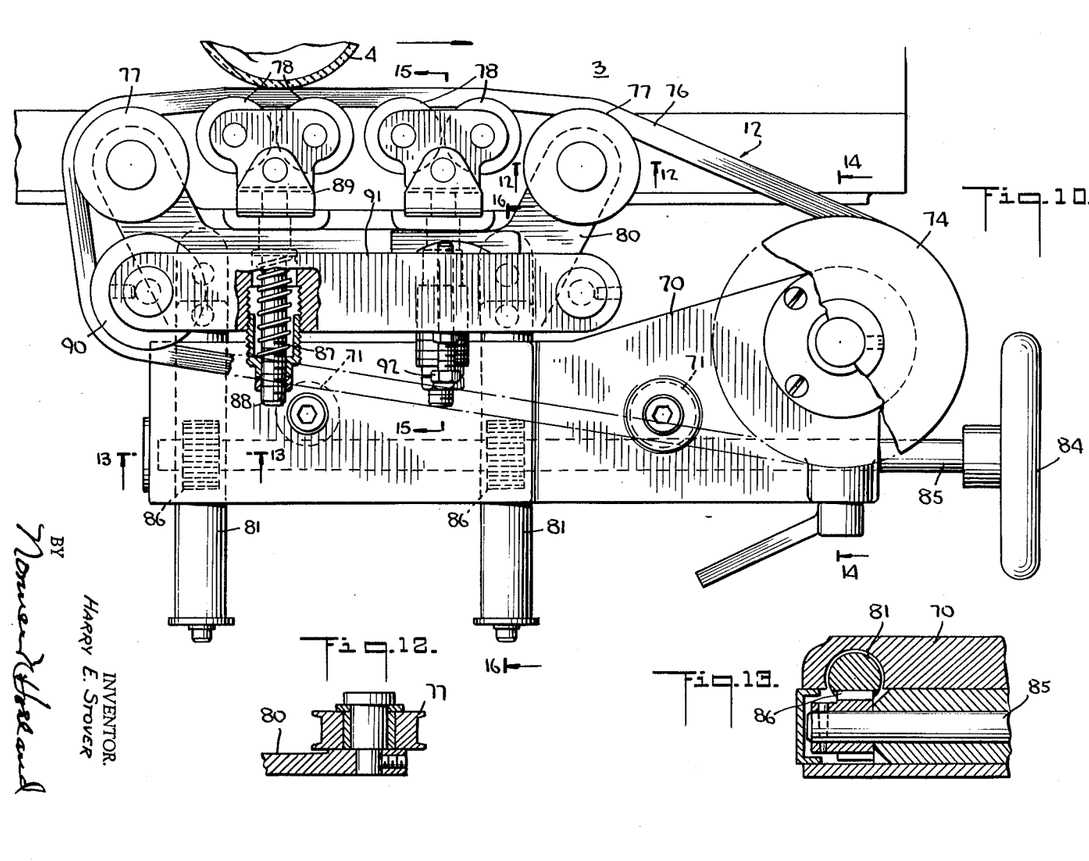
FIG. 10 is an enlarged detailed top plan view of a container rotating side belt.
FIGS. 12–16 are sectional views taken along the section lines 12—12 to 16—16 of FIG. 10.
Figures 11, 14, 15, 16:
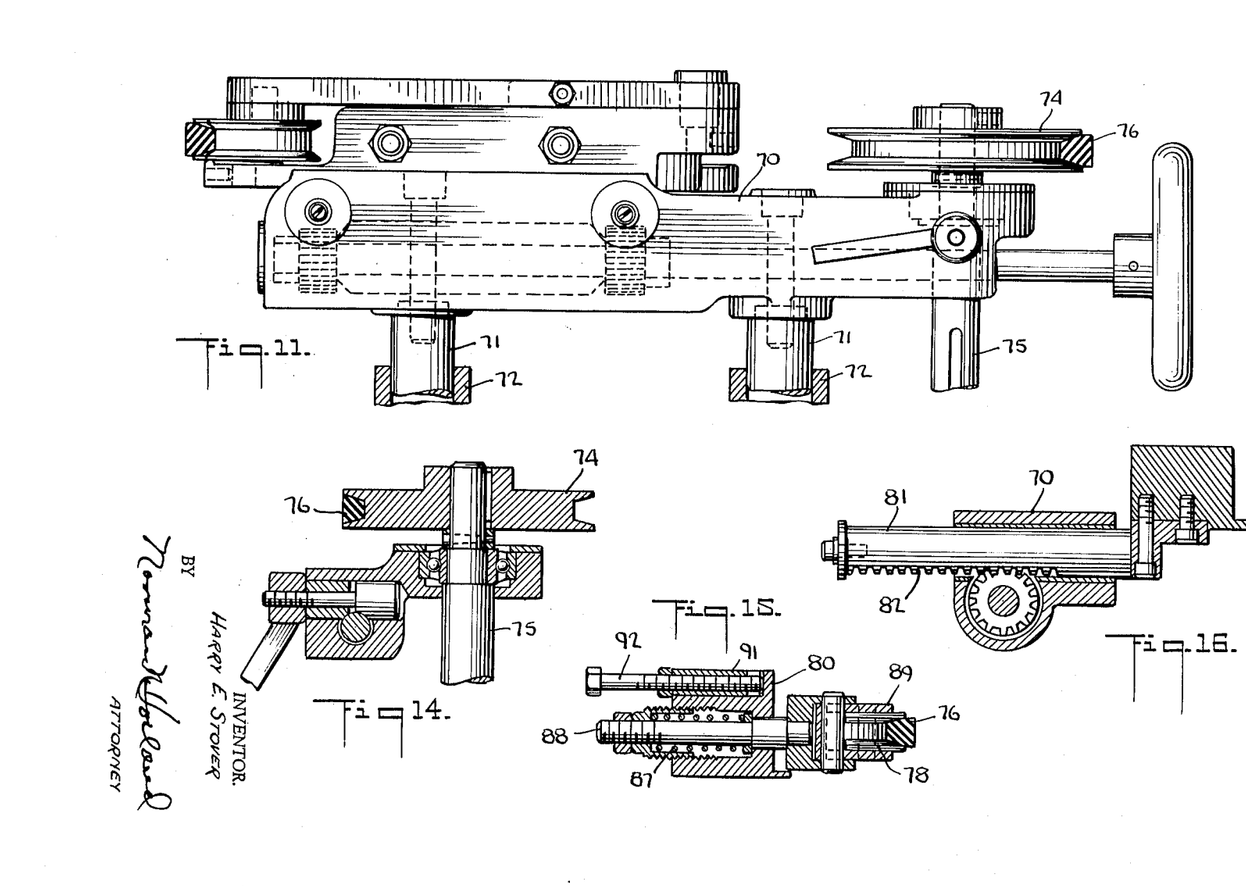
FIG. 11 is a front elevational view of the belt of FIG. 10.

FIGS. 2–5 illustrate a preferred embodiment of a container rotating assembly adapted to be positioned on one side of the conveyor 3 as is shown at 8 and 13 in FIGS. 1 and 2a. This assembly is mounted on a suitable base plate 20 which is positioned by the slidable brackets 21 at the opposite ends of the base plate 20 which slidably engage support rods 22 of the sealing means 5. The base plate 20 is supported by vertical rods 23 slidably retained in brackets 24 on the machine base 2. Ratchet portions 25 on the rods 23 permit the height of the base 20 to be adjusted by gear 26 and shaft 27. Both the belt 8 and the friction shoe 13 may be adjusted to engage the side walls of the container being sealed. The side belt 8 is driven by a drive pulley 28, whose vertical mounting shaft 29 is connected to the drive system of the sealing machine by a suitable drive connection. The belt 8 is resiliently held against the side walls of the container 4 by a pressure plate 30 having suitable belt guide pulleys 31 mounted thereon. The pressure plate 30 is mounted on reciprocably mounted sliding support rods 34 and 35, and an adjustment screw 36 threadedly attached to the mounting bracket 20 urges the end of the rod 34 inwardly towards the container side walls to hold the belt 8 against the containers with the desired force. A tensioning pulley 37 is pivotally mounted on an arm 38 on the mounting plate 20, and its position is controlled by a ratchet member 39. The ratchet member 39 permits the position of the pulley 37 to be adjusted to set the tension of belt 8 at the desired degree and to permit the readjustment of the belt 8 tension after the pressure plate 30 has been adjusted to the particular container engagement position desired. The drive pulley 28 is rotated at a speed that will move the belt 8 faster than the conveyor 3 so that a container 4 being moved into contact with the belt 8 by the conveyor 3 will be rotated in such a direction as to disengage the container threads, as more fully described above.

The friction shoe 13 is mounted at the forward end of the support plate 20 on an adjustable arm 40 whose position relative to the mounting plate 20 is controlled by an adjusting screw 41. The contact portion of the friction shoe 13 comprises a resilient contact member 42 formed of rubber or a similar gripping material and an associated mounting plate 44 fastened to the end of the arm 40. A container 4 which is being moved past the friction shoe 13 by the conveyor 3 has its side walls forced tightly against the rubber contact member 42 by the side belt 12 (FIG. 1) and the side belt 12 which is moving at a faster rate than the conveyor 3 causes the container 4 to roll along the contact surface member 42.

*Friction shoe*

In the embodiment shown in FIG. 1, two successive container rotating elements are illustrated which, as described above, rotate the container in opposite directions during the sealing action. In this embodiment the friction shoe 9 and the side belt 12 are separately mounted on frame 2 of the sealing machine 1. This permits the replacement of the friction shoe 9 by a suitable side belt to modify the machine from the embodiment shown in FIG. 29 to the embodiment shown diagrammatically in FIG. 28, where two side belts are used at the cap applying position to move the container past the cap applicator without rotation.

A preferred embodiment of the separate friction shoe 9 is illustrated in detail in FIGS. 6–9. This friction shoe 9 comprises a mounting arm 50 slidably mounted in a horizontal bracket 51 and having a rubber container contact member 52 mounted on a mounting plate 54 at its inner end. The mounting for the plate 54 includes a spring-pressure means comprising two spring-loaded mounting arms 55 which are slidably mounted in a bracket 56 on the end of the arm 50 and which permit the contact member 52 to yieldably engage the container 4 under the influence of the springs 57. The position of the contact member 52 with respect to the container side wall is adjusted by the provision of ratchet teeth 58 on the bottom of the arm 50 which engage the gear 59 on shaft 60 which mounts positioning wheel 61. The position of the shaft 60 is locked by the releasable clamp member 62. In order to permit the position of the contact member 52 to be adjusted vertically as well as horizontally, the bracket 51 for the arm 50 is mounted on movable vertical posts 64 and 65. Ratchet teeth 66 are provided on post 64 and these teeth engage a suitable gear member on a height adjusting shaft, not shown.

Container rotating belt

A preferred embodiment of the side belt 12 which cooperates with the above-described friction shoe 13 to rotate the container to cause the cap to be screwed into sealing position is shown in detail in FIGS. 10–16.

The side belt 12 comprises a base 70 mounted on two adjustable vertical posts 71 each slidably mounted in brackets 72 on the machine base 2 and having suitable height-adjusting means such as the ratchet described for the base 20 of the container rotating assembly. A drive pulley 74 is rotatably mounted at one end of the base 70 having a drive shaft 75 adapted for connection to the sealing machine drive system. The belt 76 passes around the pulley 74 and guide pulleys 77 and 78. The guide pulleys 77 position the belt 76 inwardly of the conveyor 3 so that the belt 76 engages each of the containers 4 being carried by the conveyor 3 between the side belt 12 and the friction shoe 13. The pulleys 77 are mounted on a bracket 80 which is adjustably mounted on the base 70 by sliding arms 81. The arms 81 have a ratchet 82 formed thereon and the position of the guide pulleys 77 with respect to the conveyor 3 is adjusted by the adjustment wheel 84 which is coupled to each of the arms 81 through shaft 85, gears 86, and ratchets 82. Guide pulleys 78 intermediate the guide pulleys 77 urge the belt 76 inwardly against the containers 4 under the force of springs 87. The springs 87 engage slidably mounted plungers 88 each of which has two guide pulleys 78 rotatably mounted in suitable brackets 89 at its end. A tensioning pulley 90 is adjustably mounted on arm 91. The arm 91 is pivotally mounted on the base 70 and the position of arm 91 is adjusted by a screw means 92. By setting the position of tensioning pulley 89 with screw 92, the tension of belt 76 can be set after the adjustment of the belt position by adjustment wheel 84. A clamp 94 locks the adjustment wheel 84 in its desired position for a particular size container.

Another generally similar side belt 95 is illustrated in FIGS. 20–24 which is adapted to replace the friction shoe 9 of the embodiment of FIGS. 1 and 29 when the initial reverse cap unlocking rotation is not required. The belt 95 is mounted similarly to the friction shoe 9 on vertical posts 96 and 97. The belt 98 is driven by drive pulley 99 on drive shaft 100 on base 103 and guide pulleys 101 and 102 similar to the above-described guide pulleys 77 and 78 position the belt 98 against a container. The guide pulley bracket 104 is positioned by a single guide rod 105 connected to adjustment wheel 106 by shaft 107, gear 108, and ratchet 109. Clamp 110 locks the shaft 107 in its adjusted position. Tensioning pulley 111 is mounted on arm 112 which is adjusted by screw 114.

Tapered container friction shoe

Figures 25, 26, 27:
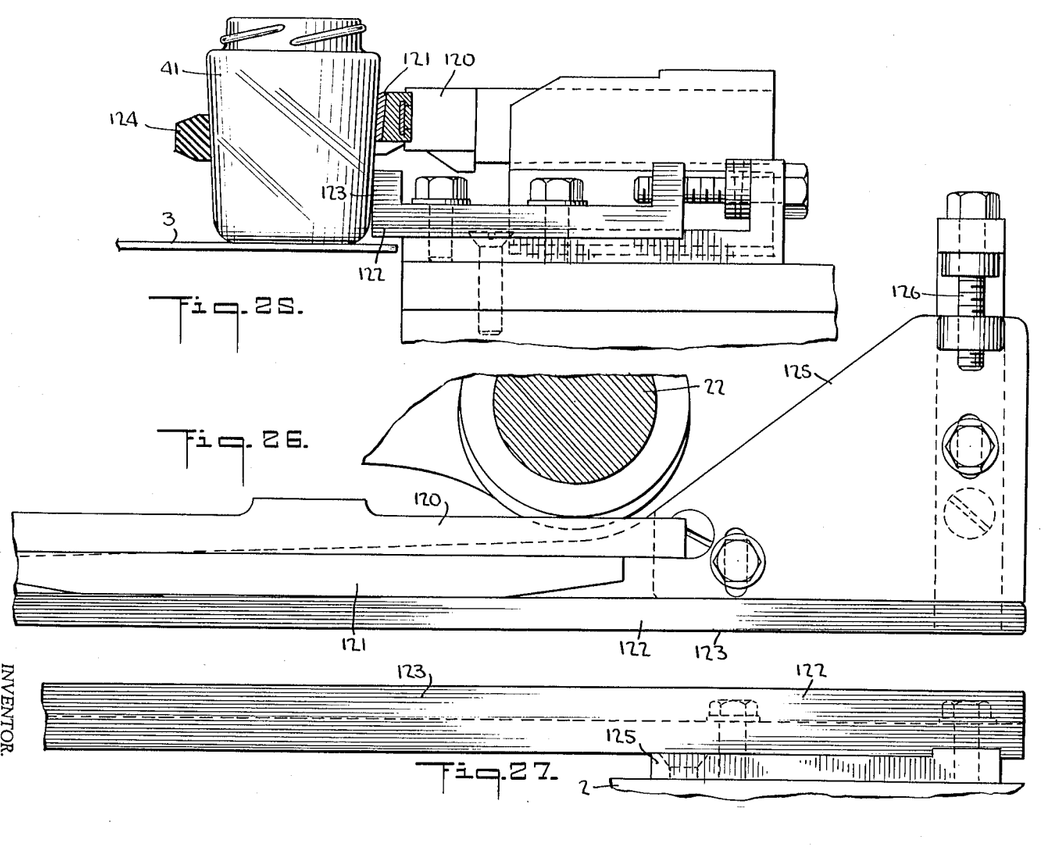
FIG. 25 is a front elevational view partially in section of another embodiment of a friction shoe means for a tapered container.
FIG. 26 is a top plan view of the friction shoe means of FIG. 25.
FIG. 27 is a front elevational view of the friction shoe means of FIG. 25.

Another embodiment of a friction shoe is illustrated in FIGS. 25–27 which is preferred for containers having tapered side walls such as the container 4' of FIG. 25. In order to rotate such containers, a relatively narrow friction shoe 120 is provided having a friction surface 121. Due to the fact that the tapered form causes all portions of the rotating side walls to move at different speeds, a second support bar 122 is provided which has a smooth surface 123 which permits the container to slide as well as rotate at this point. The container 4' is thus securely held in an upright position while being rotated by the combined action of the side belt 124 and the friction surface 121 of friction shoe 120. A suitable mounting plate 125 is provided for support bar 122 having a positioning screw at 126.

Cap applicator

Figures 17, 18, 19:
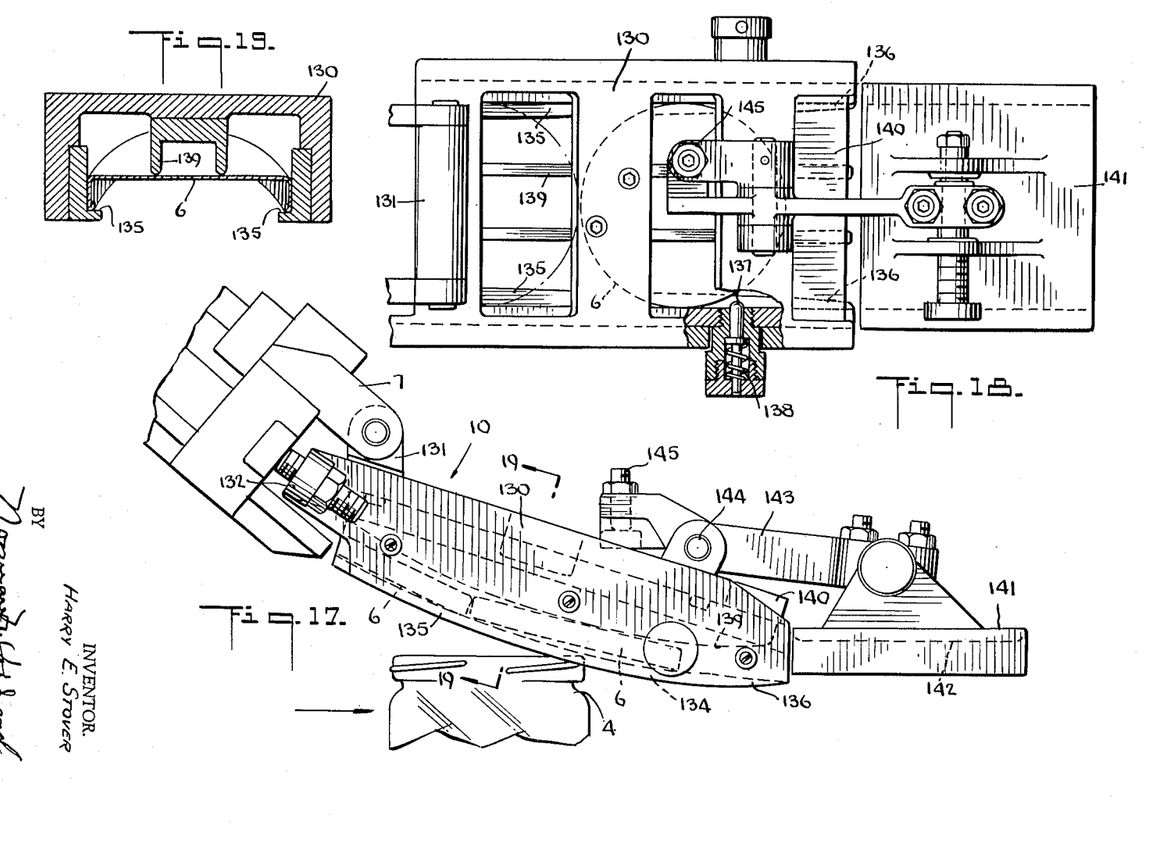
FIG. 17 is an enlarged detailed side elevational view of the cap applicator.
FIG. 18 is a top plan view of the applicator of FIG. 18.
FIG. 19 is a sectional view taken along the line 19—19 of FIG. 17.
Figures 20, 21:
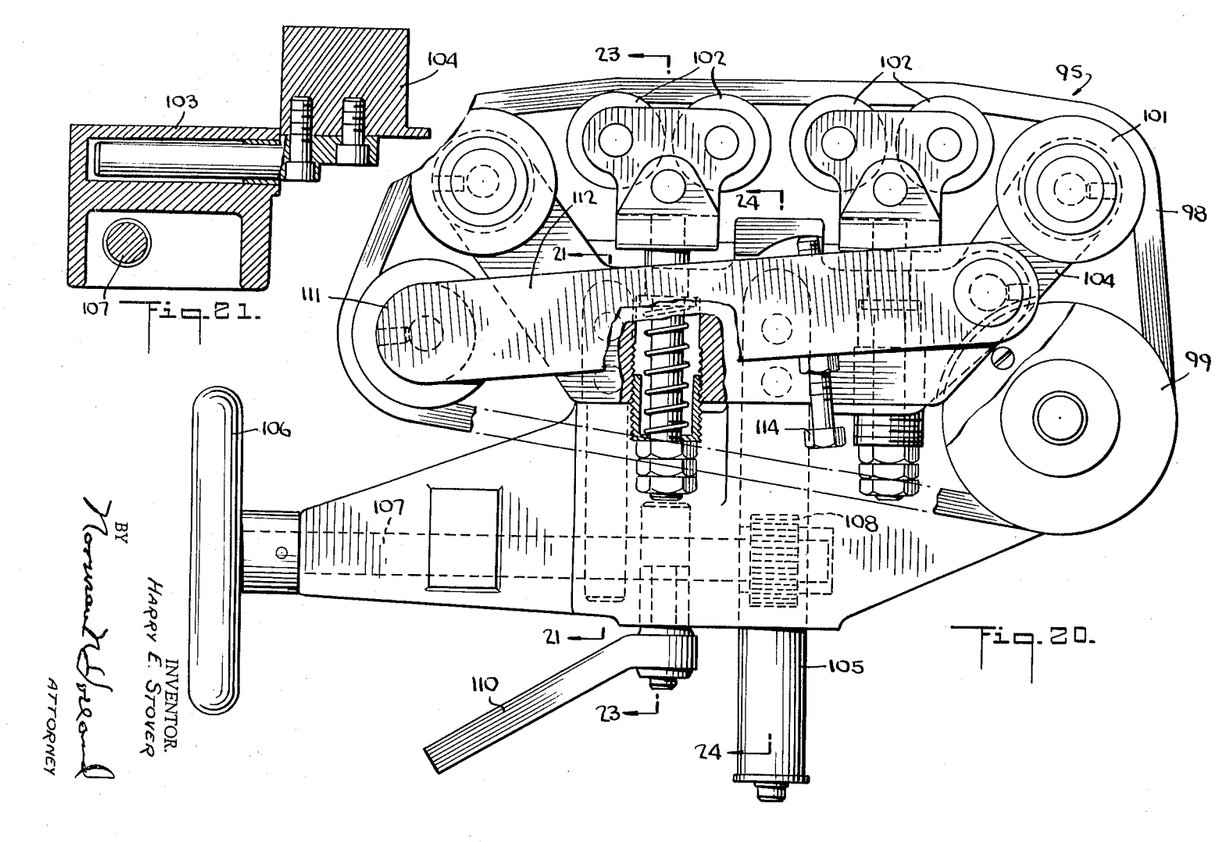
FIG. 20 is an enlarged detailed top plan view of another embodiment of a container side belt.
FIG. 21 is a sectional view taken along line 21—21 of FIG. 20.
Figures 22, 23, 24:
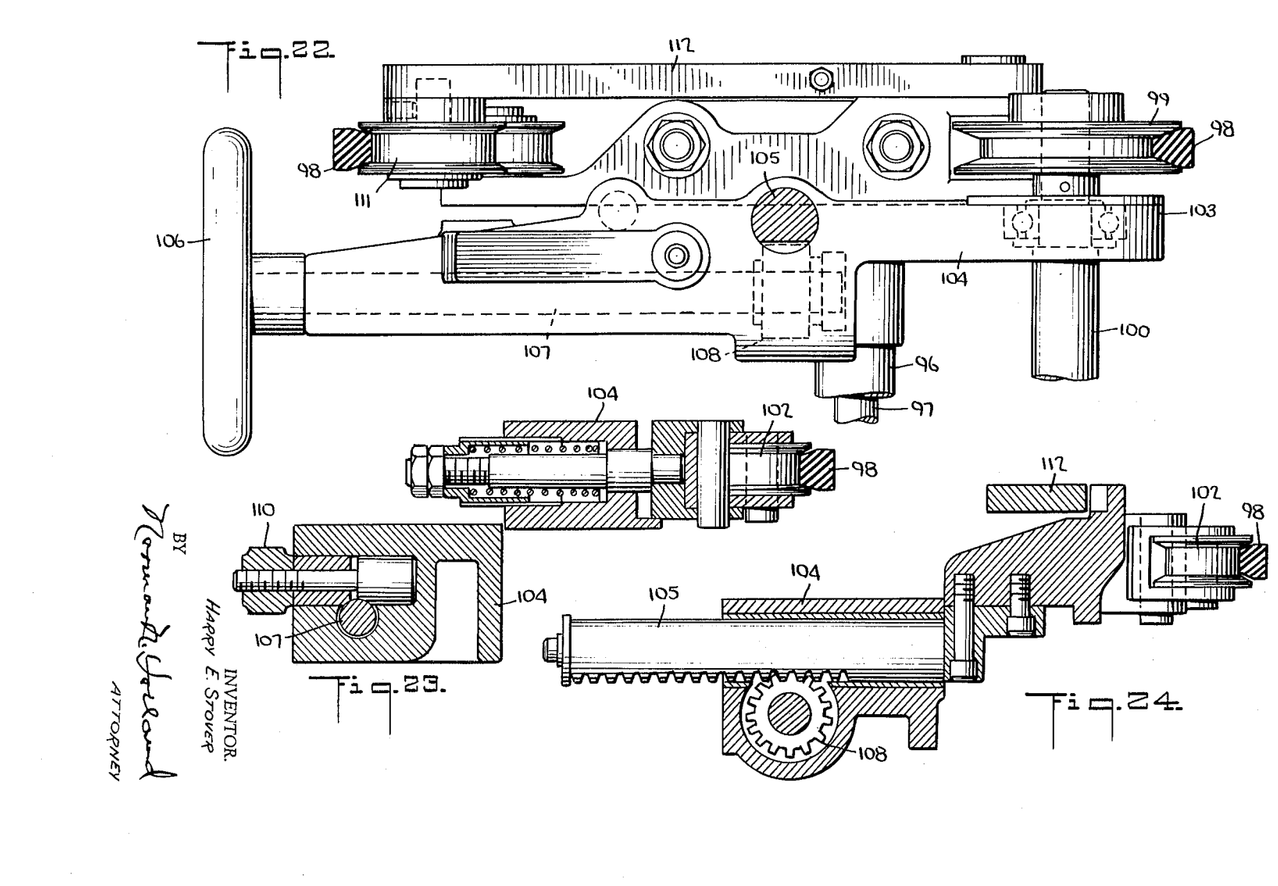
FIG. 22 is a side elevational view of the side belt of FIG. 20.
FIGS. 23 and 24 are sectional views taken along the section lines 23—23 and 24—24 of FIG. 20.

A preferred cap applicator 10 for transferring the caps 6 from the inclined chute of cap feed 7 to the top of the containers 4 is illustrated in FIGS. 17–19.

The cap applicator 10 comprises a nose portion 130 pivotally attached at 131 to the lower end 132 of the cap chute. An adjustment screw 132 positions the nose portion 130 at the desired angle to present the forward edge 134 of closures 6 to containers 4 being moved beneath the cap applicator 10. The hollow nose portion 130 has generally parallel cap support rails 135 at the opposite sides of its lower edge. As seen in FIG. 17, these cap support rails 135 are curved so that they approach a horizontal path at the outlet end 136 to place the cap in a horizontal position on the container. The rails 135 also taper outwardly and downwardly to a knife edge at the end 136 to permit the cap 6 and the top of the container 4 to approach as closely as possible as the cap 6 drops onto the container 4. A stop 137 is releasably held in the path of the closures 6 by spring 138 until a closure is drawn past it by a moving container. Curved guide rails 139 at the center portion of the nose portion 130 prevent tilting of the cap 6 as it is drawn onto the container 4. In order to further assure the level seating of the cap 6 on the container, a magnet 140 is preferably positioned adjacent the outlet end of the nose portion 130. The magnet 140 successively attracts the front and rear portions of each cap 6 to help make it drop onto the container in a level position.

A plate member 141 is pivotally mounted beyond the nose portion 130 which has a level lower surface 142 which engages the caps 6 and provides an additional leveling action and a slight downward pressure. This plate 141 cooperates with the reverse rotation of the container by the side belt 8 and the friction shoe 9 described above to position each closure on the container threads for the subsequent tightening action of belts 11 and 12 and friction shoe 13. The plate member 141 is pivotally attached to mounting arm 143 which itself is pivotally connected to the nose portion 130 at 144. The initial height of the plate member 141 prior to its contacting a closure is set by adjustment screw 145.

Operation

The operation of the sealing machine which has been described above in connection with the detailed description of the elements will now be summarized.

As described more fully above, the vertical and horizontal position of each of the side belts and friction shoes is adjustable for a particular container size. The cap feed 7 and the pressure belt 11 are also adjustable to accommodate the container height. Once these adjustments have been made, the filled containers are placed on the horizontal conveyor 3 by hand or suitable automatic feeding and spacing means. The conveyor 3 moves each container into the steam tunnel 14 wherein the steam displaces the air from the container headspace. The container 4 is next engaged between the moving side belt 8 and the friction shoe 9, and it is rotated in a direction to disengage the closure caps. The rotating container now is moved beneath the nose portion 130 of the cap applicator 10. The container top engages a closure 6 and draws it past the stop 137 onto the mouth of the container 4. The curving cap support rails 135 and the magnet 140 tend to level the cap on the container top as it drops over the container mouth. As the cap is applied to the container finish, the reverse rotation of the container tends to position the cap fastening means evenly about the container finish to prevent a cocking of the cap with respect to the container threads or lugs. The pivotally mounted plate member 141 next engages the loosely positioned cap to provide a final leveling prior to the final cap tightening. After the container is moved beyond the plate member 141, it is engaged between the cooperating friction shoe 13 and the side belt 12 which rotate it in the direction to engage the threaded-type connections on the cap and the container. The cap is simultaneously forced downwardly and restrained against rotation by the pressure belt 11. The extension 15 of the steam tunnel envelops the closure in a cloud of steam during the final tightening action to prevent the re-entry of air where a vacuum seal is being formed.

In the embodiment illustrated in FIG. 28, the initial reverse rotation is not used and two cooperating moving side belts 8 and 8' help move the containers 4 beneath the cap feed 7 as a cap is applied to each container top.

It will be seen that an improved means of sealing threaded-type containers has been disclosed in which an efficient and relatively simple straight-line sealing means is used. The means provides a tight seal adapted for forming vacuum-type seals where desired and the sealing machine of the present invention is easily adjusted for varying container and closure cap types and sizes. An improved cap applicator has been disclosed which is particularly adapted for the application of threaded-type closures in a level position on the container mouths ready for a final tightening operation.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a container sealing machine a cap feed comprising the combination of an inclined cap supporting channel, a cap applicator including a member pivotally connected to the lower end of said channel and having therein a pair of cap-supporting rails with tapered end portions, a cap engaging stop means on said supporting rails adapted to releasably hold a cap thereon, a plate member pivotally mounted outwardly of the tapered end of said pair of rails and being adapted to engage the cap as the cap is drawn onto a container top, and a magnet mounted adjacent to the lower tapered end portions of said pair of rails and adapted to lift the front and rear portions of the cap as the cap is drawn out of the rails by a moving container.

2. The container sealing machine as claimed in claim 1 which further comprises means beneath said applicator for rotating the container with respect to the cap in a disengaging direction while said cap is engaged by said magnet.

3. The container sealing machine as claimed in claim 2 in which said means to rotate the container comprises an elongated friction shoe and a driven endless belt positioned to engage opposite sides of the container.

4. In a container sealing machine a cap feed comprising the combination of an inclined cap supporting channel, a cap applicator including a member pivotally connected to the lower end of said channel and having therein a pair of cap supporting rails with tapered end portions and curving from a generally inclined position to a generally horizontal position, a cap engaging stop means on said supporting rails adapted to releasably hold a cap thereon, a plate member pivotally mounted outwardly of the tapered end of said pair of rails and being adapted to engage the cap as the cap is drawn onto a container top, adjustment members on said pair of rails and said plate member adjustably fixing the normal position of the pair of rails and the plate member while permitting free upward movement thereof about their respective pivot points, and a magnet mounted adjacent to the lower tapered end portions of said pair of rails and adapted to lift the front and rear portions of the cap as the cap is drawn out of the pair of rails by a moving container.

4. The container sealing machine as claimed in claim 4 which further comprises means beneath said applicator for rotating the container with respect to the cap in a disengaging direction while said cap is engaged by said magnet.

6. The container sealing machine as claimed in claim 5 in which said means to rotate the container comprises an elongated friction shoe and a driven endless belt positioned to engage opposite sides of the container.

References Cited in the file of this patent

UNITED STATES PATENTS

| | | |
|---|---|---|
| 1,664,514 | Kramer | Apr. 3, 1928 |
| 2,072,245 | Cuthbert et al. | Mar. 2, 1937 |
| 2,574,771 | Zimmermann et al. | Nov. 13, 1951 |
| 2,618,426 | Stover | Nov. 18, 1952 |
| 2,630,959 | Brown | Mar. 10, 1953 |
| 2,732,991 | De Bastos et al. | Jan. 31, 1956 |
| 2,734,672 | Day et al. | Feb. 14, 1956 |